(12) United States Patent
Bar-Niv (10) Patent No.: US 8,973,062 B2
(45) Date of Patent: Mar. 3, 2015

(54) MULTIMODE PHYSICAL LAYER MODULE FOR SUPPORTING DELIVERY OF HIGH-SPEED DATA SERVICES IN HOME MULTIMEDIA NETWORKS

(75) Inventor: Amir Bar-Niv, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 421 days.

(21) Appl. No.: 13/158,615

(22) Filed: Jun. 13, 2011

(65) Prior Publication Data

US 2011/0239257 A1    Sep. 29, 2011

Related U.S. Application Data

(63) Continuation-in-part of application No. 13/010,215, filed on Jan. 20, 2011.

(60) Provisional application No. 61/353,940, filed on Jun. 11, 2010, provisional application No. 61/297,112, filed on Jan. 21, 2010.

(51) Int. Cl.
| | |
|---|---|
| *H04N 7/18* | (2006.01) |
| *H04N 7/10* | (2006.01) |
| *H04N 21/436* | (2011.01) |
| *H04N 21/4363* | (2011.01) |
| *H04N 21/845* | (2011.01) |

(52) U.S. Cl.
CPC ......... *H04N 7/106* (2013.01); *H04N 21/43615* (2013.01); *H04N 21/43632* (2013.01); *H04N 21/8458* (2013.01)
USPC .............................................. 725/78; 725/79

(58) Field of Classification Search
None
See application file for complete search history.

(56) References Cited

U.S. PATENT DOCUMENTS

| | | | |
|---|---|---|---|
| 6,005,861 A | 12/1999 | Humpleman | |
| 6,553,085 B1 | 4/2003 | Trans | |
| 8,196,010 B1 * | 6/2012 | Gunnam et al. | 714/758 |
| 8,307,401 B1 * | 11/2012 | Lida | 725/80 |
| 8,367,933 B1 | 2/2013 | Mumm et al. | |
| 8,565,337 B2 | 10/2013 | Lida et al. | |
| 2003/0086515 A1 | 5/2003 | Trans et al. | |
| 2004/0120407 A1 | 6/2004 | Searles et al. | |

(Continued)

OTHER PUBLICATIONS

High-Definition Multimedia Interface Standard Version 1.4 specification, Supplement 2.*

(Continued)

*Primary Examiner* — Chenea Smith
(74) *Attorney, Agent, or Firm* — Pearl Cohen Zedek Latzer Baratz LLP (57) ABSTRACT

A multimode physical (MMP) layer circuit for physical (PHY) layer handling of signals transported over a high-definition multimedia interface (HDMI) cable in a home multimedia network, wherein the signals are compliant with at least two different PHY layer modes. The MMP layer circuits comprises a plurality of PHY transceivers respectively coupled to a plurality of TP channels of the HDMI cable through a HDMI connector, wherein each PHY transceiver of the plurality of PHY transceivers handles signals transported over its respective TP channel according to a PHY layer mode of the transported signals; and a controller is coupled to the HDMI connector and to each of the plurality of PHY transceivers, the controller recognizes the PHY layer mode of signals transported over each of the plurality of TP channels and sets each of the plurality of PHY transceivers according to the recognized PHY layer mode.

20 Claims, 5 Drawing Sheets

(56) References Cited

U.S. PATENT DOCUMENTS

| | | | |
|---|---|---|---|
| 2005/0015426 A1 | 1/2005 | Woodruff et al. | |
| 2005/0089126 A1* | 4/2005 | Zerbe et al. | 375/353 |
| 2008/0112476 A1* | 5/2008 | Vong et al. | 375/224 |
| 2008/0187028 A1* | 8/2008 | Lida | 375/140 |
| 2011/0061087 A1* | 3/2011 | Mank | 725/118 |

OTHER PUBLICATIONS

Office Action for U.S. Appl. No. 13/010,215, mailed Jun. 6, 2013.
Final Office Action for U.S. Appl. No. 13/010,215, mailed Jan. 20, 2014.

* cited by examiner

MULTIMODE PHYSICAL LAYER MODULE FOR SUPPORTING DELIVERY OF HIGH-SPEED DATA SERVICES IN HOME MULTIMEDIA NETWORKS

CROSS REFERENCE TO RELATED APPLICATIONS

This application claims the benefit of U.S. provisional application No. 61/353,940 filed Jun. 11, 2010. This application is also a continuation-in-part of U.S. patent application Ser. No. 13/010,215 filed on Jan. 20, 2011, which claims the benefit of a U.S. Provisional Application No. 61/297,112 filed on Jan. 21, 2010. The contents of each of the above-referenced applications are incorporated by reference herein.

TECHNICAL FIELD

The invention generally relates to the field of home networking, and more particularly to techniques for delivering uncompressed video on home networks.

BACKGROUND OF THE INVENTION

A typical home network today is computer-centered and emphasizes sharing printers and Internet access within a home. While functional, it is of limited interest to the typical consumer. Consumers now also demand that multimedia (audio and video) services be provided through home networking. For example, consumers would like to have the ability to watch cable or satellite TV on any TV-set in the home, to watch video downloaded from the Internet on any TV-set, or to listen to music in any part of the house.

With this aim, several home network architectures have been developed. One example for such home network architecture is based on an internal digital network interconnecting devices in the home. The home network provides connectivity of different types of devices within the home and outside the home. The devices may include analog TV-sets, digital TV-sets, DVRs, VCRs, digital camcorders, personal computers, audio equipment, and so on. The connectivity of the devices is achieved using network interfaces. Multimedia services are introduced into the network through one or more network interface units that are coupled to an external network and to the internal network. An example for such home network architecture may be found in U.S. Pat. No. 6,005,861 to Humpleman.

The drawback of such home networks is that they are not designed to support delivery of high-speed uncompressed multimedia data (e.g., high definition video) over a link connecting a source device (e.g., a network interface) and a sink device (e.g., a digital TV set). Specifically, existing home network solutions are not designed to support uncompressed video that is compliant, for example, with the high-definition multimedia interface (HDMI) or DisplayPort standards. Furthermore, currently many different services can be provided by home networks. These services include delivery of uncompressed video, Ethernet, universal serial bus (USB) connectivity, and so on.

In existing home networks, there is no capability to concurrently provide two or more of these services over a single link. In order to support concurrent high-speed traffic services a fast switching of data streams of different services is mandatory. This requires a switch connected in the home network to multiplex streams of data from different sources on the same link and then separating the streams to be sent to the different destination(s). Implementing such a switch is almost infeasible.

In addition, it is quite often desired by the typical customer to be able to capture the signals from a source device in several destination devices, e.g., being able to connect a VCR to TV-sets in different rooms in the home. It is also desired to be able to place or move these devices anywhere in the home without needing to extend or re-install the connecting cables. A wireless network may achieve these desires. However, such networks are costly and suffer from limited distance between a transmitting device and receiving device. In addition, only point-to-point connections can be achieved.

Another requirement when developing a home network to support delivery of high-speed multimedia services is to provide compatibility with existing multimedia interface standards. Such standards include, but are not limited to, High-Definition multimedia interface (HDMI), DisplayPort, USB3, DiiVA, and the like. The standards typically define the connectors and cables utilized to connect a source device (e.g., a DVD player) to a sink device (e.g., a TV set).

As most newly developed consumer electronic products are already equipped with high-speed multimedia interfaces, it would be highly advantageous if a multimedia home network would enable interoperability between high-speed multimedia interfaces and solutions for delivering high-speed data services over a home network.

SUMMARY OF THE INVENTION

Certain embodiments disclosed therein include a multimode physical (MMP) layer circuit for physical (PHY) layer handling of signals transported over a high-definition multimedia interface (HDMI) cable in a home multimedia network, wherein the signals are compliant with at least two different PHY layer modes. The MMP layer circuits comprises a plurality of PHY transceivers respectively coupled to a plurality of TP channels of the HDMI cable through a HDMI connector, wherein each PHY transceiver of the plurality of PHY transceivers handles signals transported over its respective TP channel according to a PHY layer mode of the transported signals; and a controller is coupled to the HDMI connector and to each of the plurality of PHY transceivers, the controller recognizes the PHY layer mode of signals transported over each of the plurality of TP channels and sets each of the plurality of PHY transceivers according to the recognized PHY layer mode.

Certain embodiments disclosed herein also include a home multimedia network that comprises a plurality of source nodes including any of a physical (PHY) layer module compliant with a first PHY layer mode and a second PHY layer mode, wherein the first PHY layer mode is a high-definition multimedia interface (HDMI) PHY and the second PHY layer mode enables concurrent and bi-directional transport of a plurality of high-speed data services; at least one sink node that includes a multimode physical (MMP) layer module for handling signals compliant with any one of the first PHY layer mode and the second PHY layer mode; and a switch for connecting the plurality of source nodes to the at least one sink node, the source nodes and the at least one sink node are connected to the switch through a HDMI cable.

Certain embodiments disclosed herein also include a home multimedia network that comprises at least one sink node including any of a physical (PHY) layer module compliant with a first PHY layer mode and a second PHY layer mode, wherein the first PHY layer mode is a high-definition multimedia interface (HDMI) PHY layer and the second PHY layer mode enables concurrent and bi-directional transport of a plurality of high-speed data services; at least one source node that includes a multimode physical (MMP) layer module for handling signals compliant with any one of the first PHY layer mode and the second PHY layer mode; and a switch for connecting the at least one source node to the at least one sink node, the at least one source node and the at least one sink node are connected to the switch through a HDMI cable

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
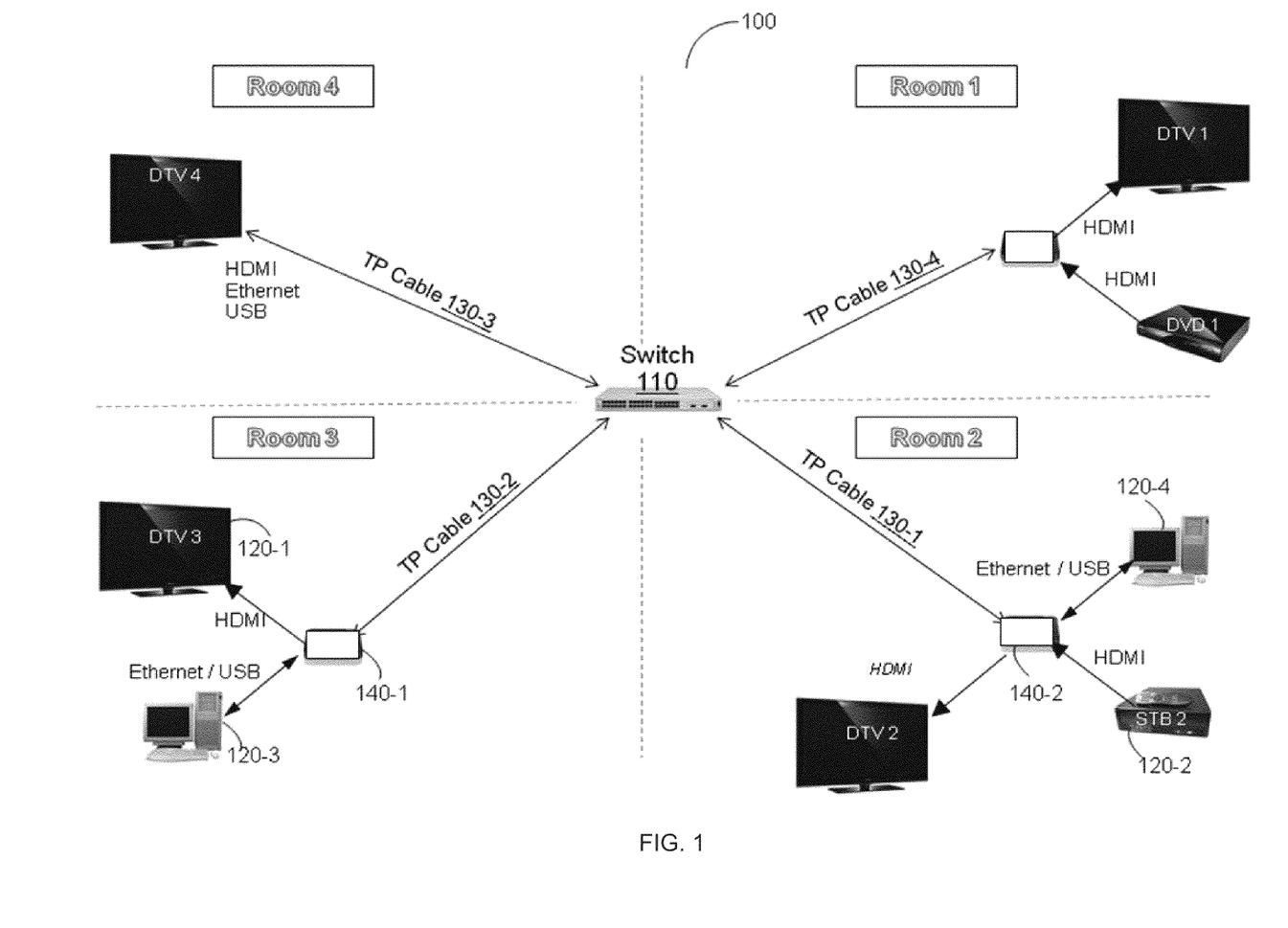
FIG. 1 is a home multimedia network constructed in accordance with the principles of the invention.

FIG. 1 shows an exemplary diagram of a home multimedia network 100 constructed in accordance with an embodiment of the invention. The network 100 is a star topology network where a switch 110 connects the devices 120 located in different rooms of a house. The connection between the switch 110 to a device 120 is through a twisted-pair (TP) cable 130. In accordance with a preferred embodiment of the invention, the TP cable 130 may be a multimedia interface cable, such as, but not limited to, a HDMI cable, a DisplayPort cable, a USB3, and the like. In another embodiment, the TP cable 130 may be, but is not limited to, a cable type of category 5 (CAT-5), CAT-6, CAT-6a, CAT-7, and the like. It should be noted that the network 100 may be wired using any combination of the above-mentioned cable types. For example, the TP cable 130-1 may be a CAT-6 cable while the TP cable 130-3 may be a HDMI cable.

A device 120 may be, but is not limited to, a high-definition digital TV-set, a computer, a high-definition set-top box, a digital video recorder (DVR), a game console, a camcorder, a Blue-ray player, and the like. The home multimedia network 100 may also include one or more aggregators 140 connecting a plurality of different types of devices 120 to the switch 110.

The devices 120 support high-speed services delivered over the TP cables 130. These high-speed services include delivering of at least uncompressed multimedia (video/audio) content, Ethernet data, and high-speed serial bus data (e.g., USB2 or USB3). For example, the uncompressed multimedia data may be compliant with at least one of the HDMI, DisplayPort, DiiVA, and other standards for transmitting of uncompressed high definition multimedia data.

In the network 100, one or more of the high-speed internet services are delivered concurrently over a single TP cable 130. Specifically, a TP cable includes a plurality of twisted-pair wires, each of which is referred to hereinafter as a TP channel (or lane). Each TP channel can independently carry data belonging to a different high-speed service.

In addition, each TP cable 130 can transport data in two different directions (bi-directional) simultaneously. With this aim, each TP channel in the TP cable 130 may be dynamically configured as either a receiver or transmitter. This feature is required as the location of source devices (e.g., set-top boxes) and sink devices (e.g., TV-sets) may be changed.

Following is a non-limiting example describing the capabilities of the home network 100. A TV-set 120-1 connected in room 3 receives uncompressed video from a set-top box (STB) 120-2 connected in room 2. The uncompressed video (e.g., HDMI video) is transported from the STB 120-2 over the TP cable 130-1 to the switch 110 which routes the video to the aggregator 140-1. At the same time, a user of a computer 120-3 saves data files to a computer 120-4 located in room 2. With this aim, the computer 120-3 is connected to the aggregator 140-1 through a USB and data files are sent from the aggregator 140-1 over the TP cable 130-2 to the switch 110, which routes the data to the aggregator 140-2 (in room 2) over the TP cable 130-1. The aggregator 140-2 is coupled to the computer 120-4.

It should be apparent from this example that uncompressed video and USB data are concurrently transmitted over the TP cables 130-1 and 130-2 in different directions. If, for example, the TP cables 130 are CAT-5 or CAT-6 cables, then two (2) TP channels may be utilized to carry the uncompressed video and two (2) channels are reserved for the USB data. It should be noted that the channels carrying the USB data can carry Ethernet data concurrently.

In accordance with an embodiment of the invention, over the home multimedia network 100, Ethernet data with high-speed data at a rate of 1 Gbps and above, USB data at a rate of 480 Mbps or 5 Gbps, and HDMI data of 5 Gbps and above can be transported. Generally, the HDMI specification requires about 4.8 Gbps for standard 1080 P/60 Hz/8 bits lane and about 9 Gbps for higher color depth or higher resolutions (like 3D video, or 4K×2K, which are new resolutions). In accordance with an embodiment of the invention, a single twisted-pair, i.e., a TP channel can be used for 1080 P/60 Hz/8 bits streams and two TPs are utilized for the 9 Gbps streams. Thus, accordingly each TP channel in a TP cable is able to support data rates of at least 5 Gbps.

In an embodiment of the invention, the switch 100 may be implemented as a simple switch which does not implement sophisticated multiplexing techniques. This is enabled in the proposed architecture, as different streams are usually transported on separate TP channels of the cable. Thus, the implementation of the switch 100 is much simpler and cost effective.

In another embodiment of the invention, the switch 100 may be integrated in the TV set, thereby enabling direct connection between different devices. In another embodiment of the invention, the aggregator 140 may be integrated in the TV set (e.g., as shown in TV 120-1) allowing the TV set to aggregate HDMI, Ethernet and USB connections, to be used internally in the TV or from other sources that are connected directly to the TV using proprietary cables (e.g., USB and HDMI) and/or TP cables.

Although multimedia signals are compliant with the HDMI and/or DisplayPort standards, a different processing is required in order to efficiently decode and encode signals transmitted over different TP channels of a TP cable 130. The processing is performed by a physical (PHY) layer module installed in each of the devices 120. Typically, a PHY layer defines an electrical, mechanical, and procedural interface to the transmission/physical medium. For example, the shapes and properties of the electrical connectors, the frequencies to broadcast on, the modulation scheme to use, and other similar low-level parameters, are defined by a PHY layer specification.

The capabilities of concurrently transporting signals of different high-speed data services between source devices and at least one sink device connected in the home multimedia network 100 over a single TP cable is enabled using a PHY layer module that supports this mode of operation. Hereinafter, the mode operation for concurrent bi-directional transport of a plurality of high-speed data services over a single TP cable is referred to as "bi-directional multimedia PHY" or "BDMMP." The techniques for enabling the BDMMP mode in the home network 100 are further described in the co-pending U.S. patent application Ser. No. 13/010,215.

To reduce the time to market and increase the popularity of the home networks that are based on the BDMMP, a PHY layer module that is compliant with the BDMMP and the currently available multimedia and data interfaces should be provided. With this aim, certain embodiments of the invention include a PHY layer module that enables interoperability between the BDMMP and currently available multimedia and data interfaces.

These embodiments will be described with a reference to a specific implementation where interpretability between the BDMMP and HDMI standard is provided. However, this should not be understood as to limit the scope of the invention. Other types of multimedia interfaces (e.g., DisplayPort or DiiVA) are specifically included herein and may be handled by the multimode PHY (MMP) layer module constructed in accordance with another embodiment.

Figure 2:
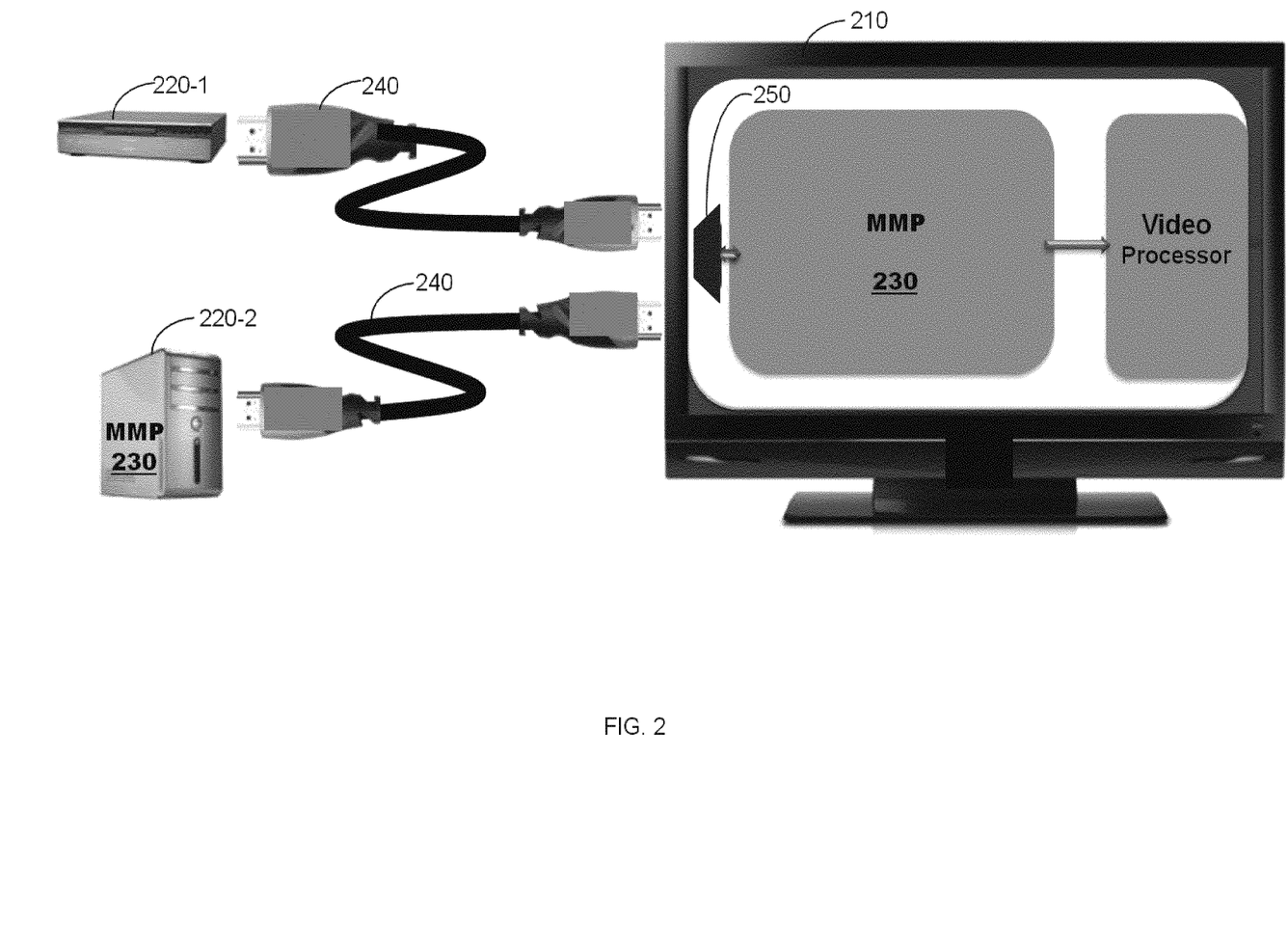
FIG. 2 is a diagram illustrating connectivity between sink and source devices in accordance with an embodiment of the invention.

FIG. 2 is an exemplary diagram utilized for describing certain embodiments of the invention. The digital TV (DTV) 210 and the source devices 220-1, 220-2 are equipped with HDMI connectors, enabling connectivity between the DTV 210 and source devices 220 through, for example, HDMI cables 240. Each HDMI cable 240 includes at least four (4) TP channels.

In the diagram shown in FIG. 2, the source device 220-1 is a DVD player compliant with the HDMI standard. The device 220-2 is a PC being capable of operating in a BDMMP mode, i.e., processing and transporting bi-directional traffic of high-speed data services including uncompressed multimedia signals and data. It should be noted that all the source devices 220 and sink device (DTV 210) can be connected and be operable in home the network 100.

The DTV 210 includes a multi-mode PHY (MMP) layer module 230 constructed in accordance with an embodiment of the invention. The MMP layer module 230 is capable of processing signals according to the PHY layer specification defined for both the HDMI and BDMMP. The signals processed by the MMP layer module 230 are then handled by link layer modules of their respective service module.

It should be appreciated that the connectivity between the devices 220 and DTV 210 is through HDMI connectors and cables. Thus, the MMP layer module 230 enables interoperability between HDMI and BDMMP modes without changing the connectors and/or cables any of the source or sink devices.

Figure 3:
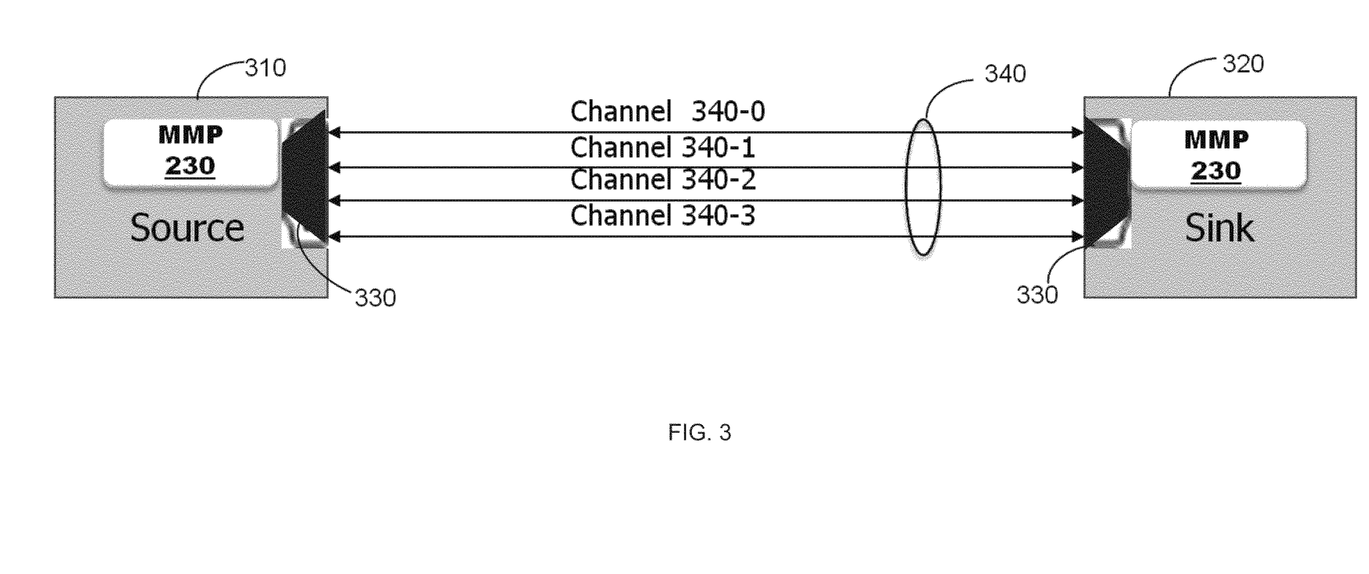
FIG. 3 is a diagram illustrating the operation of a multimode PHY (MMP) layer module in accordance with an embodiment of the invention.

The operation of the MMP layer module 230 will be described with reference to FIG. 3 which shows a source device 310 connected to a sink device 320 using a HDMI cable 340. Each of devices 310 and 320 includes a HDMI connector 330. The HDMI cable 340 connecting the devices 310 and 320 includes 4 TP channels, 340-0 through 340-3, each of which is carry signals that are of any high-speed data services supported by the BDMMP mode or signals compliant with the HDMI.

Specifically, for HDMI signals, the four (4) TP channels carry transition minimized differential signaling (TMDS) characters on three channels (channel 340-0, 340-1, and 340-2 shown in FIG. 3) and a high-speed clock signal on the fourth (clock) channel 340-3. TMDS characters encapsulate video, audio, and auxiliary data on the three channels. The HDMI cable 340 includes additional channels (not shown) to transport management, control and power signals (e.g., display data channel (DDC) and consumer electronics control (CEO) signals). However, the rate of such signals are significantly lower than the rate of the TMDS characters, thus do not require specific handling by the MMP module 230.

The TMDS characters transmitted over the channels 340-0, 340-1 and 340-2 of the HDMI cable are modulated using a non-return-to-zero (NRZ), also known as PAM-2, modulation technique. In NRZ modulation, a signal is transmitted using two voltage levels: positive and negative where a high-logic value '1' is when the signal is at a positive voltage and a low-logic value '0' is represented by a negative voltage. This is the only signal modulation allowed by the HDMI standard, thus TMDS signals are NRZ modulated.

When the devices 310 and 320 operate in a BDMMP mode, the four (4) channels 340-0, 340-1, 340-2, and 340-3 of the HDMI cable 340 act as the above-described TP channels. That is, over each channel a different high-speed data can be transported. The transmission in the BDMMP mode is bi-directional. For example, channels 340-0 and 340-1 may be utilized to carry the uncompressed video coded according the DisplayPort specification and channels 340-2 and 340-3 can carry Ethernet data and USB data concurrently.

According to certain embodiments of the invention, when operating in the BDMMP mode, signals of high-speed data services are modulated using a PAM-4 modulation technique. In a PAM-4 modulation, two bits are mapped to one of four possible differential voltage levels, for example, −3 volts, −1 volt, 1 volt, and 3 volts. Demodulation is performed by detecting the amplitude level of the carrier at every symbol period. The PAM-4 allows transmitting signals at a higher rate of the NRZ modulated signal. In accordance with another embodiment of the invention, signals of high-speed data services transported in the BDMMP mode are modulated using an orthogonal frequency-division multiplexing (OFDM) modulation technique.

Thus, the MMP layer module 230 should modulate receive and transmit signals using either a NRZ modulation (when operating in a HDMI mode) or PAM-4 modulation (in the BDMMP mode). With this aim, the MMP layer module 230, connected either at the source or sink, detects the type of the multimedia interface connected at the other end. Then, the MMP layer module 230 is set to be compliant with the multimedia interface type connected thereon.

For example, upon recognition of the type of the source's 310 PHY, the MMP layer module 230 at the sink 320 is set to support the HDMI PHY layer specification of the source 310. Various techniques for recognizing the type of a source/sink multimedia interface can be found in a co-pending U.S. application Ser. No. 12/558,673 entitled "Techniques for Achieving Complete Interoperability between Different Types of Multimedia Display Interfaces," assigned to common assignee, and is hereby incorporated by reference for all the useful information it contains.

It should be noted that when operating in a BDMMP mode, each end-point device can act as a source, sink, or combination thereof. As mentioned above, the BDMMP allows bi-directional transmission of data between two devices. Thus, for example, the source 310 may be a PC connected in the home network 100 that sends Ethernet data and receives uncompressed video over channels 340-0 through 340-3, simultaneously. It should be further noted that references made herein to a source device and a sink device should not limit the functionally of an end-device to either source or sink when operating a BDMMP mode.

Figure 4:
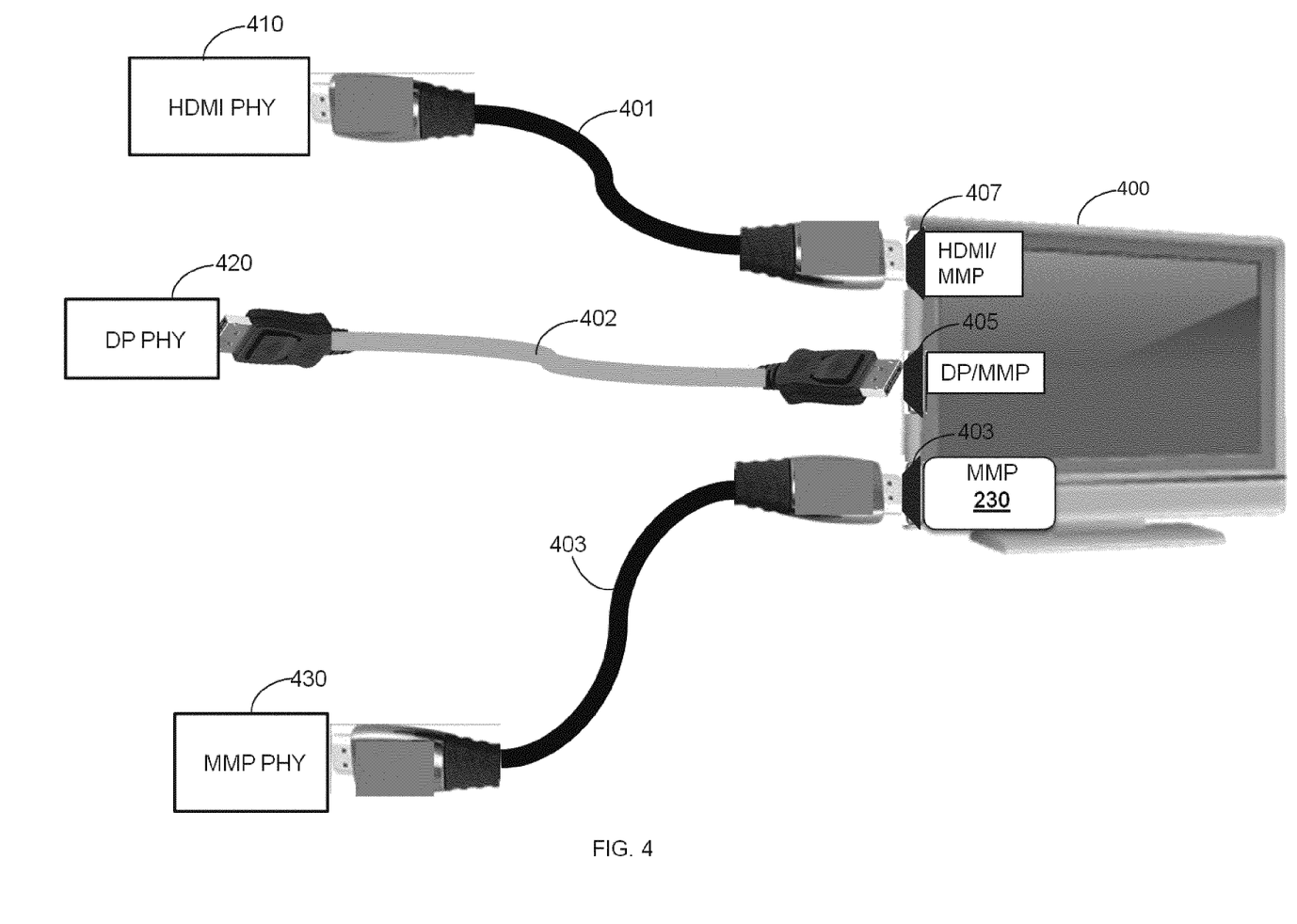
FIG. 4 is a diagram illustrating connectivity between sink and source devices in accordance with another embodiment of the invention.

FIG. 4 illustrates another embodiment of the invention where a sink device 400 includes the MMP layer module 230 connected in one of its ports 403. The source device may be a HDMI device 410, i.e., a device that supports the HDMI PHY layer, a DisplayPort device 420, i.e., a device that supports the HDMI PHY layer, and BDMMP device 430, i.e., a device that operates in a BDMMP mode and includes the MMP PHY layer module 230. The sink device 400 also includes PHY layer modules supporting standard connectivity of HDMI and/or DisplayPort, in ports 405 and 407 shown in FIG. 4. Alternatively, the MMP layer module may be connected at each of the ports 405 and 407.

In a configuration when the source device 410 is connected to the port 407 of the sink device 400, then the MMP layer module 230 operates in a HDMI mode, i.e., processes incoming signals according to the PHY layer specification defined in the various HDMI standards. Specifically, in this mode of operation, the MMP layer module 230 is configured to receive and recover TMDS characters that are NRZ modulated. Alternatively, when the source device 430 is connected to the sink at the port 403, then the MMP layer module 230 operates in the BDMMP mode. The MMP layer module 230 automatically recognizes the PHY's type of the source device 430 connected to its port 403 as a BDMMP mode. In this mode, the MMP layer module 230 is configured to receive and recover signals that are PAM-4 modulated.

As can be understood from the embodiment illustrated in the FIG. 4, the MMP layer module 230 supports services delivered according to the HDMI standard and services supported by the BDMMP mode. As mentioned above, in the BDMMP mode, high-speed data services are concurrently transported over the cable connecting the source and sink device, where the high-speed data services include at least uncompressed multimedia data, Ethernet data, and USB data.

In certain configurations, the sink device includes only a HDMI PHY layer module and the source device includes the MMP layer module, where the sink and source device are connected using a HDMI cable. In such configurations, the MMP layer module 230 when operating in the BDMMP mode transmits, BDMMP-coded signals that are PAM-4 modulated. Alternatively, when the MMP layer module 230 operates in the HDMI mode it transmits TMDS characters that are NRZ modulated.

Figure 5:
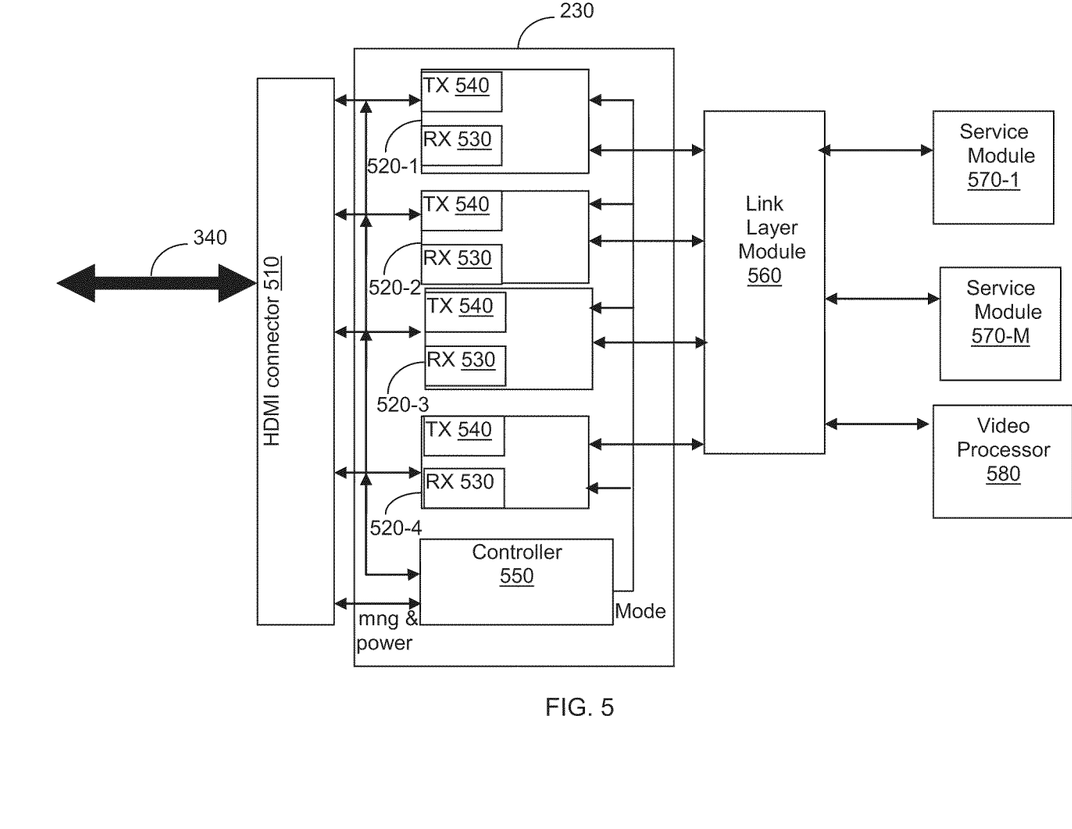
FIG. 5 is a diagram of a MMP layer module implemented in accordance with an embodiment of the invention.

FIG. 5 shows an exemplary and a non-limiting block diagram of the MMP layer module 230 constructed according to an embodiment of the invention. The MMP module 230 is connected to a HDMI connecter 510 and includes at least four (4) physical (PHY) transceivers 520-0, 520-1, 520-2, and 520-3. Each of the PHY transceivers 520-0, 520-1, 520-2, and 520-3 is connected to a single channel (TP channel) of an HDMI cable 340 (e.g., channels 340-0 through 340-3 shown in FIG. 3) and is capable of operating in HDMI or BDMMP modes described-above. A PHY transceiver 520 includes a receiver 530 and a transmitter 540.

A receiver 530 recovers, in a BDMMP mode, signals of a high-speed data service that are BDMMP coded and PAM-4 modulated and transmitted on a single TP channel. In the HDMI mode, the receiver 530 recovers HDMI signals that are TMDS coded and NRZ modulated and transmitted over a single TP cable.

The transmitter (TX) 540 transmits signals according to the modulation techniques implemented by the PHY layer module at the other end of the HDMI cable 340. Specifically, in the HDMI mode, TMDS characters are NRZ modulated and transmitted. In the BDMMP mode, the transmitter 540 modulates and transmits signals of any of the high-speed data services using PAM-4 modulation.

The receiver (RX) 530 also performs the function of de-serializing input data stream, i.e., performing serial-to-parallel conversions on serial signals received on the HDMI cable 340. The transmitter 540 serializes parallel data stream prior to transmission. Thus, a pair of receiver 530 and transmitter 540 in a transceiver 520 implements Serializer/Deserializer (SerDes) functions.

It should be noted that when operating in the BDMMP mode, each of the PHY transceivers 520 can handle a different high-speed data service. For example, PHY transceiver 520-1 processes USB data while the PHY transceiver 520-2 processes Ethernet data.

According to an embodiment of the invention, the MMP layer module 230 includes a controller 550 to set the modulation technique to be performed by each of the PHY transceivers 520. The controller 550 senses the signals at the HDMI connector 510 to recognize the type of the interface connected at the other end of the HDMI cable. If the interface is a BDMMP based, a PAM-4 modulation is applied; when the interface is a HDMI, a NRZ (2-PAM) modulation is utilized. Accordingly, the controller 550 sets the modulation mode to be performed by each PHY transceiver 520 using the "mode" signal. The controller 550 also receives the management (e.g., DDC and CEO signals) and power signals from the HDMI connector 510.

The controller 550 further enables/disables the receiver 530 and transmitter 540 in each PHY transceiver 520 according to the PHY mode and type of a device in which the MMP layer module 230 is installed. Specifically, if the module 230 is operable in a sink device in a HDMI PHY layer mode, then all receivers 530 are enabled and the transmitters 540 are disabled. Alternatively, when the module 230 is part of a source device and operates in the HDMI PHY layer mode, then all receivers 530 are disabled and the transmitters 540 are enabled.

When the MMP layer module 230 is configured to operate in the BDMMP mode, then the receiver 530 and transmitter 540 in each PHY transceiver 520 are dynamically enabled/disabled according to the type of high-speed data service and direction of data on the TP channel to which the PHY transceiver 520 is coupled.

According to an embodiment of the invention, a receiver 530 in a PHY transceiver 520 is designed to cancel crosstalk noise signals and provide signal equalization at the analog domain (processing of analog signals). In addition, the receiver 530 includes a clock data recovery (CDR) circuit (not shown) to recover data and clock signals transmitted over a TP channel.

The CDR implemented according to an embodiment of the invention is capable of recovering signals that are either NRZ (PAM-2) or PAM-4 modulated. The mode of recovery is set by the "mode" signal. An example for a CDR circuit that can be implemented in a receiver 530 according to an embodiment of the invention can be found in U.S. patent application Ser. No. 13/157,526 entitled "AN APPARATUS AND METHOD THEREOF FOR CLOCK AND DATA RECOVERY OF N-PAM ENCODED SIGNALS USING A CONVENTIONAL 2-PAM CDR CIRCUIT" to Slezak et al., assigned to common assignee, and is hereby incorporated by reference for all the useful information it contains.

In an embodiment of the invention, the MMP layer module 230 is connected to a link layer module 560 which is further coupled to a plurality of service modules 570-1 through 570-M and a video processor 580. Each of the service modules 570 processes data respective of a specific high-speed data service. The service modules 570 may be, for example, an Ethernet MAC module and a USB controller. The video processor 580 processes TMDS characters according to the HDMI standard.

The link layer module 560 forwards, in the BDMMP mode, signals received through a MMP layer module 230 to one the service modules 570 that handle the service of the received signals. In addition, signals from a service module 570 are routed, by the link layer module 560, to the respective PHY transceiver 520 in the MMP layer module 230 that handles this service. For example, if the PHY transceiver 520-1 processes the USB data, signals from a USB controller (e.g., module 570-1) are directed to a PHY transceiver (e.g., transceiver 540-1) that transmit/receive USB data on a TP channel. The routing between a PHY layer module 230 and a service module 570 is according to, for example, a tag name, a MAC address, and so on. In the HDMI mode of operation, signals are routed between MMP layer module 230 and the video processor 580.

In certain embodiments of the invention, the signals transported over the home multimedia network when operating in the BDMMP mode are NRZ modulated, according to characteristics set for NRZ modulation defined for this mode of operation. This ability is described in detail in the co-pending application Ser. No. 13/010,215 referenced above. As discussed earlier, HDMI signals are NRZ modulated according to the HDMI PHY specification. Although, NRZ modulation can be used both for BDMMP and HDMI signals, the modulation characteristics including, for example, signal amplitude and pre-emphasis, are different for the two PHY layer modes, HDMI and BDMMP. In addition, signals are coded differently, i.e., the HDMI signals are TMDS coded and in the BDMMMP, a coding technique that is different that the TMDS is utilized.

Thus, even when the signals of high-speed data services in the home multimedia network are NRZ modulated, interoperability between HDMI and BDMMP PHY layers is required. With this aim, the MMP layer module 230 handles the signals according to detected PHY layer mode at the other hand of the cable. Specifically, such handling includes setting the direction of the transmission/reception of each PHY transceiver 520, as discussed above, decoding signals according to coding utilized by the respective PHY layer mode (e.g., TMDS or BDMMP coding), and recovering the signals according to the NRZ's characteristics set for the respective PHY layer module.

The foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What is claimed is:

1. A multimode physical (MMP) layer circuit module for physical (PHY) layer handling of signals transported over a high-definition multimedia interface (HDMI) cable in the home multimedia network, wherein the signals are compliant with at least two different PHY layer modes, the MMP layer circuit module comprising:
    a plurality of PHY transceivers respectively coupled to a plurality of twisted pair (TP) channels of the HDMI cable through a HDMI connector, wherein each PHY transceiver of the plurality of PHY transceivers is capable of operating in said at least two different PHY layer modes to handle signals transported over its respective TP channel according to a PHY layer mode of the transported signals; and
    a controller coupled to the HDMI connector and to each of the plurality of PHY transceivers, to recognize the PHY layer mode of signals transported over each of the plurality of TP channels and set a modulation mode to be performed by each of the plurality of PHY transceivers according to the recognized PHY layer mode.

2. The MMP layer circuit module of claim 1, wherein a first PHY layer mode of the two different PHY layer modes is a HDMI PHY layer and a second PHY layer mode of the two different PHY layer modes is a PHY layer mode enabling concurrent and bi-directional transport of a plurality of high-speed data services over the HDMI cable in the home multimedia network.

3. The MMP layer circuit module of claim 2, wherein the plurality of high-speed data services in the second PHY layer mode include any one of uncompressed multimedia data, Ethernet data, and USB data, wherein different TP channels carry signals of different high-speed data services.

4. The MMP layer circuit module of claim 2, wherein the signals compliant with the first PHY layer mode are non-return-to-zero (NRZ) modulated and transition minimized differential signaling (TMDS) coded, and signals compliant with the second PHY layer mode are pulse-amplitude modulation-4 (PAM-4) modulated and not TMDS coded.

5. The MMP layer circuit module of claim 4, wherein each of the plurality of the PHY transceivers include a receiver and a transmitter, wherein the receiver when set to operate in the first PHY layer mode recovers signals that are NRZ modulated and when set to operate in the second PHY layer mode recovers signals that are PAM-4 modulated.

6. The MMP layer circuit module of claim 5, wherein the transmitter when set to operate in the first PHY layer mode modulates signals using a NRZ modulation and when set to operate in the second PHY layer mode modulates signals using PAM-4 modulation.

7. The MMP layer circuit module of claim 6, wherein the PAM-4 modulation further comprises an orthogonal frequency-division multiplexing (OFDM) modulation.

8. The MMP layer circuit module of claim 2, wherein the signals compliant with the first PHY layer mode are non-return-to-zero (NRZ) modulated according to a first set of modulation characteristics and transition minimized differential signaling (TMDS) coded, and signals compliant with the second PHY layer mode are NRZ modulated according to a second set of characteristics and not TMDS coded, the second set of characteristics include at least signal amplitude and pre-emphasis.

9. The MMP layer circuit module of claim 5, wherein the receiver de-serializes received signals and the transmitter serializes transmitted signals.

10. The MMP layer circuit module of claim 5, wherein in the first PHY layer mode either all receivers of the plurality of the PHY transceivers are active or all transmitters of the plurality of the PHY transceivers are active.

11. The MMP layer circuit module of claim 10, wherein in the second PHY mode the receiver and transmitter of each PHY transceiver of the plurality of the PHY transceivers is activated according to the direction of signals of a high-speed data service transported over a TP channel connected to the each PHY transceiver.

12. The MMP layer circuit module of claim 11, wherein the activation of each receiver and transmitter of each PHY transceiver of the plurality of the PHY transceivers is performed by the controller.

13. The MMP layer circuit module of claim 1, wherein the plurality of TP channels include three TMDS channels and a clock channel of a HDMI cable.

14. A home multimedia network, comprising:
a plurality of source nodes including a physical (PHY) layer module compliant with any of a first PHY layer mode and a second PHY layer mode, wherein the first PHY layer mode is a high-definition multimedia interface (HDMI) PHY and the second PHY layer mode enables concurrent and bi-directional transport of a plurality of high-speed data services;
at least one sink node that includes a multimode physical (MMP) layer module for handling signals compliant with any one of the first PHY layer mode and the second PHY layer mode; and
a switch for connecting the plurality of source nodes to the at least one sink node; wherein:
the source nodes and the at least one sink node are connected to the switch through a HDMI cable; and
the multimode physical (MMP) layer module comprises a plurality of PHY transceivers respectively coupled through a HDMI connector to a plurality of twisted pair (TP) channels of the HDMI cable connecting the at least one sink node to the switch, wherein each PHY transceiver of the plurality of PHY transceivers is capable of operating in said at least two different PHY layer modes to handle signals transported over its respective TP channel according to a PHY layer mode of the transported signals; and
a controller coupled to the HDMI connector and to each of the plurality of PHY transceivers, to recognize the PHY layer mode of signals transported over each of the plurality of TP channels and set a modulation mode to be performed by each of the plurality of PHY transceivers according to the recognized PHY layer mode.

15. The home multimedia network of claim 14, wherein the high-speed data services are concurrently transported over the HDMI cable, wherein the high-speed data services include at least uncompressed multimedia data, Ethernet data, and universal serial bus (USB) data.

16. The home multimedia network of claim 14, wherein signals compliant with the first PHY layer mode are non-return-to-zero (NRZ) modulated and transition minimized differential signaling (TMDS) coded, and signals compliant with the second PHY layer mode are PAM-4 modulated and not TMDS coded.

17. The home multimedia network of claim 14, wherein the signals compliant with the first PHY layer mode are non-return-to-zero (NRZ) modulated according to a first set of modulation characteristics and transition minimized differential signaling (TMDS) coded, and signals compliant with the second PHY layer mode are NRZ modulated according to a second set of characteristics and not TMDS coded, the second set of characteristics include at least signal amplitude and pre-emphasis.

18. The home multimedia network of claim 16, wherein the controller sets each PHY transceiver of the plurality of the PHY transceivers to only receive signals when operating in the first PHY layer mode and the controller sets each PHY transceiver of the plurality of the PHY transceivers to receive signals or transmit signals according to the type of high-speed data service handled by each PHY transceiver when operating in the second PHY layer mode.

19. The home multimedia network of claim 16, wherein when operating in the second PHY layer mode different PHY transceivers carry signals of different high-speed data services.

20. A home multimedia network, comprising:
at least one sink node including a physical (PHY) layer module compliant with any of a first PHY layer mode and a second PHY layer mode, wherein the first PHY layer mode is a high-definition multimedia interface (HDMI) PHY layer and the second PHY layer mode enables concurrent and bi-directional transport of a plurality of high-speed data services;
at least one source node that includes a multimode physical (MMP) layer module for handling signals compliant with any one of the first PHY layer mode and the second PHY layer mode; and
a switch for connecting the at least one source node to the at least one sink node; wherein:
the at least one source node and the at least one sink node are connected to the switch through a HDMI cable; and
the multimode physical (MMP) layer module comprises a plurality of PHY transceivers respectively coupled through a HDMI connector to a plurality of twisted pair (TP) channels of the HDMI cable connecting the at least one source node to the switch, wherein each PHY transceiver of the plurality of PHY transceivers is capable of operating in said at least two different PHY layer modes to handle signals transported over its respective TP channel according to a PHY layer mode of the transported signals; and
a controller coupled to the HDMI connector and to each of the plurality of PHY transceivers, to recognize the PHY layer mode of signals transported over each of the plurality of TP channels and set a modulation mode to be performed by each of the plurality of PHY transceivers according to the recognized PHY layer mode.

* * * * *